(12) United States Patent
Kim et al.

(10) Patent No.: US 8,768,569 B2
(45) Date of Patent: Jul. 1, 2014

(54) INFORMATION PROVIDING METHOD FOR MOBILE TERMINAL AND APPARATUS THEREOF

(71) Applicant: LG Electronics Inc., Seoul (KR)

(72) Inventors: Mingoo Kim, Seoul (KR); Kwangjae Lee, Seoul (KR); Jungwoo Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 13/889,968

(22) Filed: May 8, 2013

(65) Prior Publication Data

US 2013/0311038 A1    Nov. 21, 2013

(30) Foreign Application Priority Data

May 15, 2012  (KR) .................. 10-2012-0051612

(51) Int. Cl.
*G06F 7/00*          (2006.01)
*G08G 1/0967*        (2006.01)
*G01C 21/36*         (2006.01)
*G08G 1/00*          (2006.01)

(52) U.S. Cl.
CPC .... *G08G 1/096716* (2013.01); *G08G 1/096775* (2013.01); *G08G 1/09675* (2013.01); *G01C 21/3697* (2013.01); *G08G 1/00* (2013.01)
USPC ............. 701/36; 701/117; 701/533; 340/438; 340/670; 340/905

(58) Field of Classification Search
CPC .................. G08G 1/096716; G08G 1/096775; G08G 1/09765; G08G 1/00; G01C 21/3697
USPC ............... 701/36, 117, 533; 714/805; 709/94, 709/224; 705/23; 382/175, 306; 340/438, 340/670, 905; G9B/7.012, 27.019, 7.005, G9B/11.047, 23.092, 7.067, 23.088
See application file for complete search history.

(56) References Cited

U.S. PATENT DOCUMENTS

| | | | | |
|---|---|---|---|---|
| 6,122,682 | A * | 9/2000 | Andrews | 710/65 |
| 6,266,589 | B1 * | 7/2001 | Boies et al. | 701/36 |
| 7,825,825 | B2 * | 11/2010 | Park | 340/907 |
| 8,392,099 | B2 * | 3/2013 | Choi | 701/117 |
| 2006/0284839 | A1 * | 12/2006 | Breed et al. | 345/156 |
| 2007/0124041 | A1 * | 5/2007 | Kwon et al. | 701/35 |
| 2008/0119966 | A1 * | 5/2008 | Breed et al. | 701/2 |
| 2009/0115632 | A1 * | 5/2009 | Park | 340/905 |
| 2009/0299857 | A1 * | 12/2009 | Brubaker | 705/14.66 |
| 2011/0098916 | A1 * | 4/2011 | Jang | 701/201 |
| 2011/0190972 | A1 * | 8/2011 | Timmons et al. | 701/29 |
| 2012/0296567 | A1 * | 11/2012 | Breed | 701/468 |

OTHER PUBLICATIONS

European Patent Office Application Serial No. 13002354.2, Search Report dated Aug. 7, 2013, 9 pages.

* cited by examiner

*Primary Examiner* — McDieunel Marc
(74) *Attorney, Agent, or Firm* — Lee, Hong, Degerman, Kang & Waimey

(57) ABSTRACT

This specification relates to an information providing method and an apparatus thereof, capable of providing information based on a user profile according to a travel state and/or a current location of a vehicle. The method includes detecting a travel state of a vehicle, detecting a current location of the vehicle; acquiring a user profile associated with the vehicle, and providing information related to the travel state of the vehicle, the current location and the user profile.

30 Claims, 9 Drawing Sheets

INFORMATION PROVIDING METHOD FOR MOBILE TERMINAL AND APPARATUS THEREOF

CROSS-REFERENCE TO RELATED APPLICATIONS

Pursuant to 35 U.S.C. §119(a), this application claims the benefit of earlier filing date and right of priority to Korean Application No. 10-2012-0051612, filed on May 15, 2012, the contents of which is incorporated by reference herein in its entirety.

BACKGROUND OF THE INVENTION

1. Field of the Invention

This specification relates to a method for providing information and an apparatus thereof.

2. Background of the Invention

In general, an information providing apparatus according to the related art is applied to various devices such as mobile terminals, notebook computers, television sets and the like, and provides users with various types of information such as television broadcasting programs, audio information and the like.

SUMMARY OF THE INVENTION

To achieve these and other advantages and in accordance with the purpose of this specification, as embodied and broadly described herein, there is provided an information providing method, including detecting a travel state of a vehicle, detecting a current location of the vehicle, acquiring a user profile associated with the vehicle, and providing information relating to the travel state of the vehicle, the current location and the user profile.

In accordance with one embodiment of the present disclosure, the method may further include receiving information associated with the user profile, included in information corresponding to the current location of the vehicle, from a sever or a storage unit when the vehicle has stopped, and outputting the information associated with the user profile to an output unit while the vehicle is in the stop state.

In accordance with one embodiment of the present disclosure, the user profile may further include user preference information.

In accordance with one embodiment of the present disclosure, the providing of information may include providing multimedia data associated with the user preference among multimedia data corresponding to a location at which the vehicle has stopped.

In accordance with one embodiment of the present disclosure, the method may further include receiving traffic light information from a traffic light when the vehicle has stopped, detecting signal waiting time information of the vehicle from the traffic light information, receiving the information associated with the user profile, included in the information corresponding to the current location of the vehicle, from a server or a storage unit, and outputting the information associated with the user profile to an output unit for the signal waiting time.

In accordance with one embodiment of the present disclosure, the method may further include blocking the output of the information associated with the user profile after the signal waiting time elapses.

In accordance with one embodiment of the present disclosure, the method may further include outputting only an audio signal, with blocking an image signal, of the information associated with the user profile after the signal waiting time elapses.

In accordance with one embodiment of the present disclosure, the providing of the information may include providing information associated with a user profile based on the moving state when the vehicle is in the moving state, and providing information associated with a user profile based on the stop state when the vehicle is in the stop state.

In accordance with one embodiment of the present disclosure, the providing of the information may further include acquiring vehicle-related information based on the travel state when the vehicle is in the travel state, and providing the vehicle-related information based on information corresponding to a driver behavior regulation in the road traffic law.

In accordance with one embodiment of the present disclosure, the providing of the vehicle-related information may be performed to output an audio signal, with blocking an image signal, of the image signal and the audio signal included in the vehicle-related information when the vehicle is in the travel state.

In accordance with one embodiment of the present disclosure, the providing of the information may further include acquiring vehicle-related information based on the stop state when the vehicle has stopped, and providing the vehicle-related information based on information corresponding to a driver behavior regulation in the road traffic law.

In accordance with one embodiment of the present disclosure, the providing of the vehicle-related information may be performed to output image and audio signals included in the vehicle-related information when the vehicle is in the stop state.

To achieve these and other advantages and in accordance with the purpose of this specification, as embodied and broadly described herein, there is provided an information providing apparatus including a controller to detect a travel state of a vehicle, detect a current location of the vehicle, and acquire a user profile associated with the vehicle, and an output unit to output information related to the travel state of the vehicle, the current location and the user profile.

To achieve these and other advantages and in accordance with the purpose of this specification, as embodied and broadly described herein, there is provided an information providing system including a controller to detect travel state of a vehicle, detect a current location of the vehicle, and acquire a user profile associated with the vehicle, a communication unit to request information relating to the travel state of the vehicle, the current location and the user profile via a communication network, and a server to read the related information in response to the request, and transmit the read information to the controller via the communication unit, wherein the controller may provide the read information to the user.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
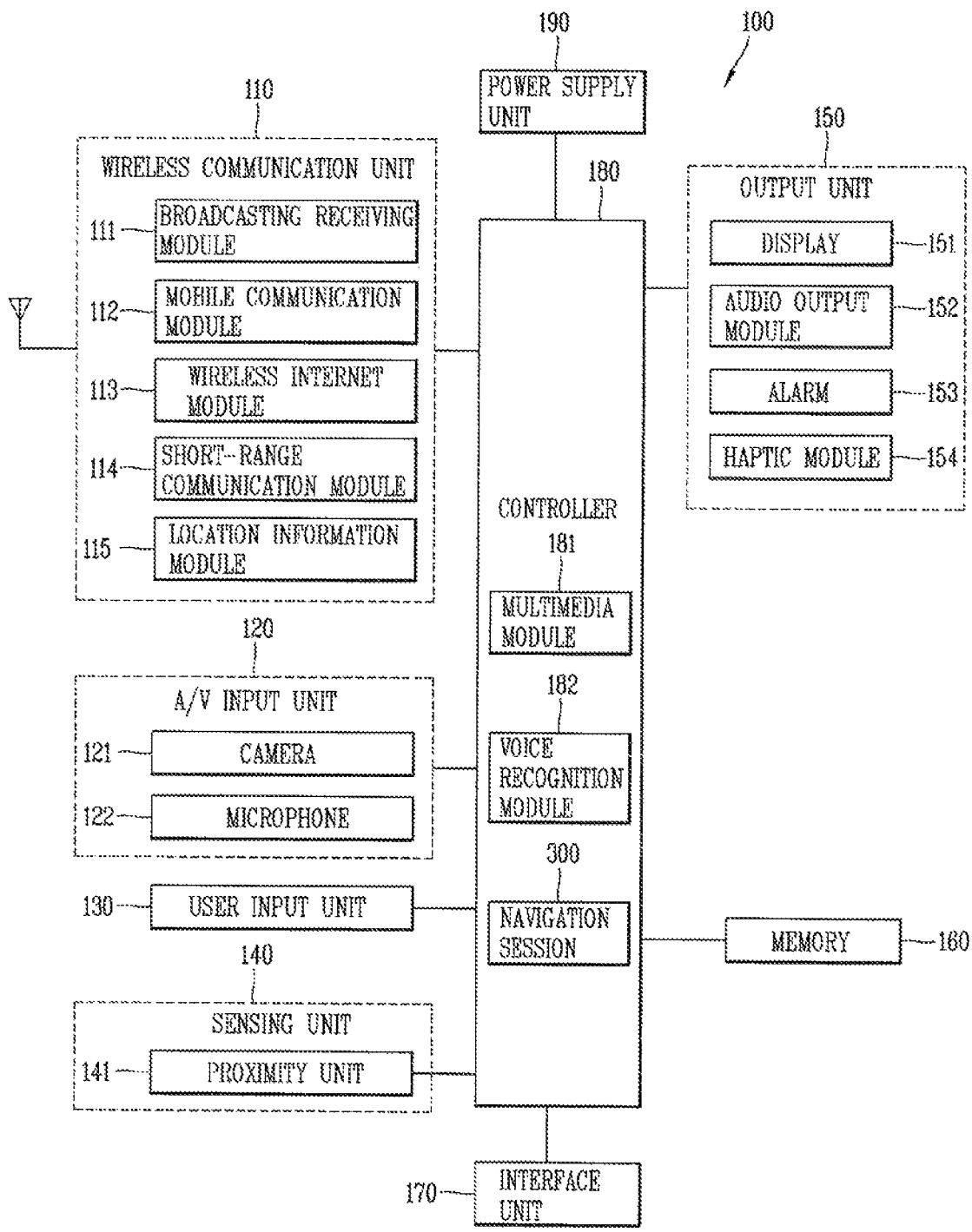
FIG. 1 is a block diagram showing a configuration of a mobile communication terminal in accordance with one exemplary embodiment.

It should be noted that technological terms used herein are merely used to describe a specific embodiment, but not to limit the present disclosure. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

Furthermore, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

In describing the present disclosure, moreover, the detailed description will be omitted when a specific description for publicly known technologies to which the invention pertains is judged to obscure the gist of the present disclosure. Also, it should be noted that the accompanying drawings are merely illustrated to easily explain the spirit of the invention, and therefore, they should not be construed to limit the spirit of the invention by the accompanying drawings.

Hereinafter, description will be given of a navigation method and apparatus for a mobile terminal in accordance with exemplary embodiments, capable of providing information of a traffic light positioned at each road section to a vehicle driver to thus provide information regarding an accurate road situation to the vehicle driver, capable of providing information regarding whether or not an intersection can be entered based on traffic light information and traffic volume information (i.e., a traffic congestion degree) to a vehicle driver, to allow the vehicle driver to safely drive on the road, capable of audibly guiding signal information of a traffic light to thus obtain user convenience, and capable of providing traffic light information and traffic signal violation vehicle information to a vehicle driver to allow the vehicle driver stably drive on the road (e.g., an intersection) according to exemplary embodiments, with reference to FIGS. 1 to 12.

FIG. 1 is a block diagram showing a configuration of a mobile communication terminal 100 in accordance with one exemplary embodiment. The mobile communication terminal (or mobile terminal) 100 may be implemented in various forms such as mobile phones, smart phones, notebook computers, digital broadcast terminals, PDAs (Personal Digital Assistants), PMPs (Portable Multimedia Player), etc.

As shown in FIG. 1, the mobile communication terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile communication terminal 100 having various components, but it is understood that implementing all of the illustrated components is not a requirement. The mobile communication terminal 100 may be implemented by greater or fewer components.

The wireless communication unit 110 typically includes one or more components allowing radio communication between the mobile communication terminal 100 and a wireless communication system or a network in which the mobile communication terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112. The broadcast signal may exist in various forms. For example, it may exist in the form of an electronic program guide (EPG) of a digital multimedia broadcasting (DMB) system, an electronic service guide (ESG) of a digital video broadcast-handheld (DVB-H) system, and the like.

The broadcast receiving module 111 may be configured to receive signals broadcast by using various types of broadcast systems. In particular, the broadcast receiving module 111 may receive a digital broadcast by using a digital broadcast system such as a multimedia broadcasting-terrestrial (DMB-T) system, a digital multimedia broadcasting-satellite (DMB-S) system, a data broadcasting system such as media forward link only (MediaFLO®), a digital video broadcast-handheld (DVB-H) system, integrated services digital broadcast-terrestrial (ISDB-T), etc. The broadcast receiving module 111 may be configured to be suitable for additional broadcast systems that provide a broadcast signal as well as the above-mentioned digital broadcast systems. Broadcast signals and/ or broadcast-associated information received via the broadcast receiving module 111 may be stored in the memory 160 (or anther type of storage medium).

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile communication terminal This module may be internally or externally coupled to the mobile communication terminal 100. Wireless internet can be supported using one or more of the following: a wireless local area network (WLAN), Wi-Fi, wireless broadband (WiBro), world interoperability for microwave access (WiMAX), high speed downlink packet access (HSDPA), and the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location of the mobile communication terminal (when the mobile communication terminal is located in a vehicle, the location of the vehicle can be determined). For example, the location information module 115 may include a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile communication terminal according to trigonometry based on the measured time and distances. A method of acquiring distance and time information from three satellites and performing error correction with a single satellite may be used. In particular, the GPS module may acquire an accurate time together with three-dimensional speed information as well as latitude, longitude and altitude values from the location information received from the satellites. As the location information module 115, a Wi-Fi location system and/or hybrid positioning system may be used.

The A/V input unit 120 is configured to receive an audio or video signal. The A/V input unit 120 may include a camera 121 (or other image capture device) and a microphone 122 (or other sound pick-up device). The camera 121 processes image data of still pictures or video acquired by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile communication terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 (or other detection means) detects a current status (or state) of the mobile communication terminal 100 such as an opened or closed state of the mobile communication terminal 100, a location of the mobile communication terminal 100, the presence or absence of user contact with the mobile communication terminal 100 (e.g., touch inputs), the orientation of the mobile communication terminal 100, an acceleration or deceleration movement and direction of the mobile communication terminal 100, etc., and generates commands or signals for controlling the operation of the mobile communication terminal 100. For example, when the mobile communication terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 (or other connection means) serves as an interface by which at least one external device may be connected with the mobile communication terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like. Here, the identification module may be a memory chip (or other element with memory or storage capabilities) that stores various information for authenticating a user's authority for using the mobile communication terminal 100 and may include a user identity module (UIM), a subscriber identity module (SIM) a universal subscriber identity module (USIM), and the like.

In addition, the device having the identification module (referred to as the 'identifying device', hereinafter) may take the form of a smart card. Accordingly, the identifying device may be connected with the terminal 100 via a port or other connection mechanisms. The interface unit 170 may be used to receive inputs (e.g., data, information, power, etc.) from an external device and transfer the received inputs to one or more elements within the mobile communication terminal 100 or may be used to transfer data between the mobile communication terminal and an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile communication terminal 100. For example, when the mobile communication terminal 100 is in a phone call mode, the display unit 151 may display a User Interface (UI) or a Graphic User Interface (GUI) associated with a call or other communication (such as text messaging, multimedia file downloading, etc.). When the mobile communication terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

The mobile communication terminal 100 may include two or more display units (or other display devices) according to its implementation type. For example, the mobile communication terminal may include both an external display unit and an internal display unit.

Meanwhile, when a sensor (referred to as a 'touch sensor', hereinafter) for detecting a touch operation of the display unit 151 is overlaid in a layered manner (referred to as a 'touch screen'), the display unit 151 may function as both an input device and an output device. The touch sensor may, for example, take the form of a touch film, a touch sheet, a touch pad, and the like.

The touch sensor may be configured to convert the pressure applied to a particular portion of the display unit 151 or a change in capacitance generated at a particular portion of the display unit 151 into an electrical input signal. The touch sensor may be configured to detect a touch input pressure as well as a touch input location and a touch input area. When there is a touch input with respect to the touch sensor, the corresponding signal(s) are sent to a touch controller. The touch controller processes the signal(s) and transmits corresponding data to the controller 180. Accordingly, the controller 180 can recognize a touched region of the display unit 151.

The proximity sensor 141 may be may be disposed within the mobile terminal covered by the touch screen or near the touch screen. The proximity sensor 141 refers to a sensor for detecting the presence or absence of an object that accesses a certain detect surface or an object that exists nearby by using the force of electromagnetism or infrared rays without a mechanical contact. Thus, the proximity sensor 141 has a longer life span compared with a contact type sensor, and it can be utilized for various purposes.

The proximity sensor 141 may be, for example, a transmission type photo sensor, a direct reflection type photo sensor, a mirror-reflection type photo sensor, an RF oscillation type proximity sensor, a capacitance type proximity sensor, a magnetic proximity sensor, or an infrared proximity sensor. When the touch screen is an electrostatic type touch screen, an approach of the pointer is detected based on a change in an electric field according to the approach of the pointer. In this case, the touch screen (touch sensor) may be classified as a proximity sensor.

Recognition of the pointer located to be close to the touch screen without being in contact with the touch screen will be called a 'proximity touch', while recognition of actual contacting of a pointer on the touch screen will be called a 'contact touch'. In this case, when the pointer is in the state of a proximity touch, it means that the pointer is located to correspond vertically to the touch screen.

The proximity sensor 141 may detect a proximity touch and a proximity touch pattern (e.g., a proximity touch distance, a proximity touch speed, a proximity touch time, a proximity touch location, a proximity touch movement state, or the like), and output information corresponding to the detected proximity touch operation and the proximity touch pattern to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile communication terminal 100 (e.g., a call signal reception sound, a message reception sound, other communication reception sounds, etc.). The audio output module 152 may include a speaker, a buzzer, or other sound generating device.

The alarm unit 153 (or other type of user notification devices) may provide outputs to inform about the occurrence of an event of the mobile communication terminal 100. Typical events may include call reception, message reception, key signal inputs, a touch input, etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (e.g., vibrations) to inform the user thereof. Or, when a key signal is input, a vibrating member may vibrate the mobile communication terminal 100 to feedback the key signal input. By providing such tactile outputs, the user can recognize the occurrence of various events. Outputs associated with the occurrence of an event may be also provided via the display unit 151 or the audio output module 152.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as by stimulation using a pin arrangement vertically moving with respect to a contact skin, a spray force or suction force of air through a jet orifice or a suction opening, a contact on the skin, a contact of an electrode, electrostatic force, or an effect by reproducing the sense of cold and warmth using an element that can absorb or generate heat.

The haptic module 154 may be implemented to allow the user to feel a tactile effect through a muscle sensation such as fingers or arms of the user, as well as transferring the tactile effect through a direct contact. Two or more haptic modules 154 may be provided according to the configuration of a telematics terminal. For example, the haptic module 154 may be provided at a steering wheel, a gear shift lever, a car seat, and the like.

The memory 160 may store programs used for processing and controlling operations performed by the controller 180, or may temporarily store data (e.g., a phonebook, messages, still images, video, etc.) that is inputted or outputted. The memory 160 may include at least one type of storage medium including a Flash memory, a hard disk, a multimedia card micro type memory, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile communication terminal 100 may be operated in relation to a web storage device that performs the storage function of the memory 160 over the Internet.

The interface unit 170 serves as an interface with external devices connected with the mobile terminal 100. For example, the interface unit 170 may transmit data to an external device, receive and transmit power to elements of the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating a user of the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port. The interface unit 170 may be used to receive inputs (e.g., data, information, power, etc.) from an external device and transfer the received inputs to one or more elements within the mobile terminal 100 or may be used to transfer data between the mobile terminal and an external device.

When the mobile communication terminal 100 is connected with an external cradle, the interface unit 170 may serve as a conduit to allow power from the cradle to be supplied there through to the mobile communication terminal 100 or may serve as a conduit to allow various command signals inputted from the cradle to be transferred to the mobile communication terminal there through. Various command signals or power inputted from the cradle may operate as signals for recognizing when the mobile communication terminal is properly mounted on the cradle.

The controller 180 typically controls the general operations of the mobile communication terminal 100. For example, the controller 180 may perform controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform pattern recognition processing to recognize a handwriting input or a picture drawing input performed on the touch screen as characters or images.

The power supply unit 190 receives external power or internal power and supplies appropriate power required for operating respective elements and components under the control of the controller 180.

Functions of those components applied to the mobile communication terminal 100 described herein may be implemented in a computer-readable or similar medium using, for example, software, hardware, or any combination thereof. For hardware implementation, the processes may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units designed to perform the functions described herein. In some cases, such processes may be implemented by the controller 180 itself. For software implementation, the processes, such as procedures or functions, may be implemented together with separate software modules that allow performing of at least one function or operation. Software codes can be implemented by a software application (or program) written in any suitable programming language. The software codes may be stored in the memory 160 and executed by the controller 180.

A voice recognition module 182 may recognize a voice generated by the user and perform a corresponding function according to the recognized voice signal.

A navigation session 300 applied to the mobile communication terminal 100 may display travel route map data.

Figure 2:
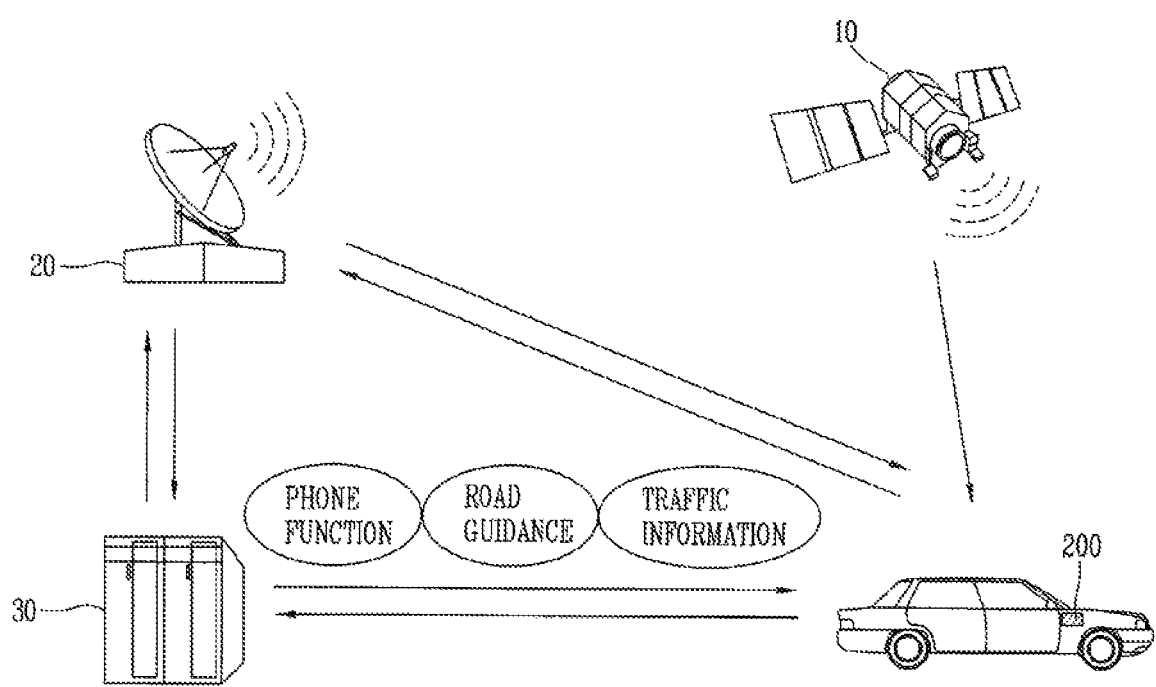
FIG. 2 is a block diagram showing a vehicle navigation system according to an exemplary embodiment.

FIG. 2 is a block diagram illustrating a vehicle navigation system in accordance with an exemplary embodiment.

As illustrated in FIG. 2, a vehicle navigation system 300 may include an information providing center 30 for providing traffic information and various data (e.g., programs, execution files, etc.), and a telematics terminal 200 that is mounted within a vehicle, receives traffic information via a remote wireless communication network 20 and/or short-range wireless communication network, and provides a road guidance service based on a GPS signal received via an artificial satellite 10 and the traffic information. Here, the communication network may further include wired/wireless communication networks such as local area network (LAN) and wide area network (WAN). Various traffic information (for example, road traffic information, interested area information) in addition to traffic light information may be collected via the communication network, and the collected information may be processed according to a transport protocol expert group (TPEG) standard in the information providing center 30 (for example, a server), to be sent to a broadcast station. The broadcast station may then insert the traffic information including the traffic light information into a broadcast signal and broadcast it to the vehicle 200.

The server may reconfigure (reconstruct) a digital broadcast service through various routes connected to the communication network, for example, an operator input, wired/wireless Internet, transparent data channel (TDC) and multimedia object transport (MOC), and various traffic information collected from a different server or a probe car, into a traffic information format such as a format in conformity with the TPEG standard, a standard for a traffic information service. The server may then transmit the reconfigured information to the broadcast station.

The server may generate traffic information of a TPEG format including traffic light information, and transmit the generated traffic information to the broadcast station.

The broadcast station may insert the traffic information including the traffic light information which has been received from the server into a broadcast signal and wirelessly transmit the broadcast signal to a traffic information reception terminal mounted in the vehicle 200, for example, a navigation apparatus. The traffic information may include the traffic light information, and additionally include information relating to various traffic conditions, which are required for operating the road, sea and air transportation, such as an accident, a road condition, traffic congestion, road construction, a road closure, a public traffic network delay, an air transportation holdup and the like.

The broadcast station may receive the processed traffic information including the traffic light information from the server and transmit it to the vehicle 200 through a digital signal in conformity with various digital broadcasting standards. Here, the broadcast standards may include various types of digital broadcast standards, such as a Europe-oriented digital audio broadcasting (DAB) standard based on Eureca-147 [ETSI EN 300 401], terrestrial or satellite digital multimedia broadcasting (DMB) standard, a terrestrial digital video broadcasting (DVB-T) standard, a digital video broadcasting-handheld (DVB-H) standard, a media forward link only (MFLO) standard, and the like.

Also, the broadcast station may transmit the traffic information including the traffic light information via a wireline/wireless network such as wireline/wireless Internet.

The vehicle 200 may refer to every carrier, which can be implemented by using a mechanical and electronic device for the purpose of transporting people or objects, such as general passenger cars, buses, trains, ships, aircraft, and the like.

The vehicle 200 may include a traffic information reception terminal mounted therein, receive the traffic light information from the broadcast station using the mounted traffic information reception terminal, process the traffic light information, and transfer the processed traffic light information to a user via graphic, text and/or audio.

Hereinafter, description will be given of the configuration of the telematics terminal according to an exemplary embodiment, with reference to FIG. 3.

Figure 3:
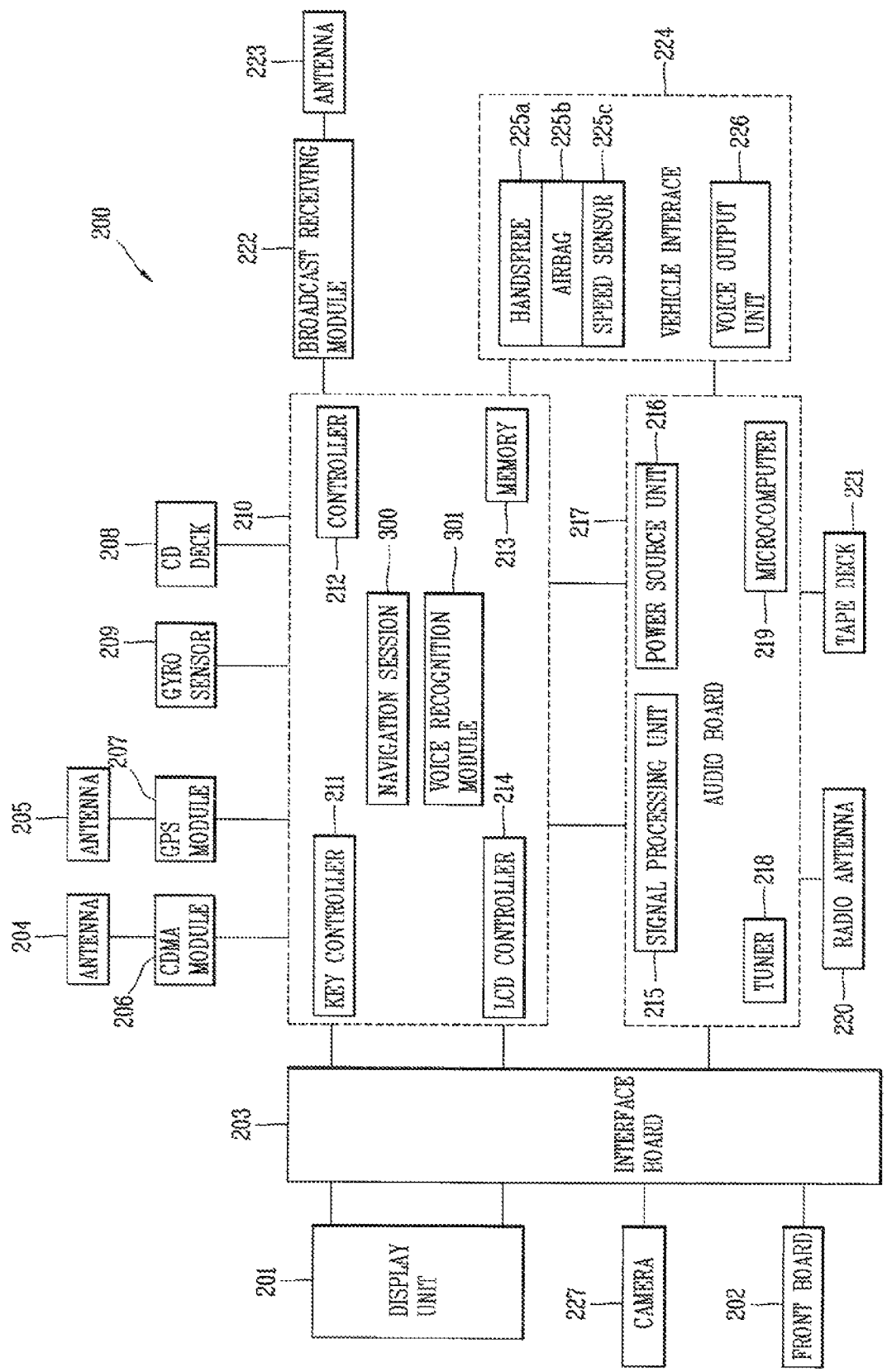
FIG. 3 is a block diagram showing a configuration of a telematics terminal in accordance with an exemplary embodiment.

FIG. 3 is a block diagram showing a configuration of a telematics terminal 200 in accordance with an exemplary embodiment.

As shown in FIG. 3, the telematics terminal 200 may include a main board 210 including a controller (for example, a central processing unit (CPU)) 212 for overall control of the telematics terminal 200, a memory 213 for storing various information, a key controller 211 for controlling various key signals, and an LCD controller 214 for controlling an LCD.

The memory 213 may store map information (map data) for displaying road guidance information on a digital map. The memory 213 may additionally store a traffic information collecting control algorithm for inputting traffic information according to the situation of a road along which the vehicle currently travels (runs), and information for controlling the algorithm.

The main board 210 may include a code division multiple access (CDMA) module 206 as a mobile terminal having a unique device number assigned and installed in the vehicle, a GPS module 207 for announcing a location of the vehicle, receiving a GPS signal for tracking a travel route from a start point to a destination, or transmitting traffic information collected by the user via a GPS signal, a CD deck 208 for reproducing a signal recorded in a compact disk (CD), a gyro sensor 209 and the like. The CDMA module 206 and the GPS module 207 may transmit and receive signals via antennas 204 and 205.

A broadcast receiving module 222 may be connected with the main board 210 and receive a broadcast signal via an antenna 223. The main board 210 may be connected via an interface board 203 with a display unit (i.e., an LCD) 201 controlled by the LCD controller 214, a front board 202 controlled by the key controller 211, and a camera 227 for capturing the interior and/or the exterior of the vehicle. The display unit 201 may display various video signals and character signals, and the front board 202 may include buttons for various key signal inputs and provide a key signal corresponding to a button selected by the user to the main board 210. In some instances, the display unit 201 may include a proximity sensor of FIG. 2 and a touch sensor (touch screen).

The front board 202 may include a menu key for directly inputting traffic information. The menu key may be controlled by the key controller 211.

An audio board 217 may be connected to the main board 210 and process various audio signals. The audio board 217 may include a microcomputer 219 for controlling the audio board 217, a tuner 218 for receiving a radio signal, a power supply unit 216 for supplying power to the microcomputer 219 and a signal processing unit 215 for processing various voice signals.

The audio board 217 may also include a radio antenna 220 for receiving a radio signal and a tape deck 221 for playing an audio tape. The audio board 217 may further include an audio output unit (for example, an amplifier) 226 for outputting a voice signal processed by the audio board 217.

The audio output unit (amplifier) 226 may be connected to a vehicle interface 224. Namely, the audio board 217 and the main board 210 may be connected to the vehicle interface 224. A hands-free module 225a for receiving a voice signal, an airbag 225b configured for the security of a passenger, a speed sensor 225c for detecting the speed of the vehicle and the like may be connected to the vehicle interface 224. The speed sensor 225c may calculate a vehicle speed and provide the calculated vehicle speed information to the CPU 212.

A navigation session 300 applied to the telematics terminal 200 may generate road guidance information based on the map data and current location information of the vehicle and provide the generated road guidance information to a user.

The display unit 201 may detect a proximity touch within a display window via the proximity sensor. For example, when a pointer (e.g., user's finger or stylus) give a proximity touch, the display unit 201 may detect the position of the proximity touch and output position information corresponding to the detected position to the controller 212.

A voice recognition device (or a voice recognition module) 301 may recognize a voice pronounced by the user and perform a corresponding function according to the recognized voice signal.

The navigation session 300 applied to the telematics terminal 200 may display a travel route on map data. When the mobile terminal 100 is located within a preset distance from a blind spot included in the travel route, the navigation session 300 may automatically form wireless networks with terminals (e.g., vehicle navigation apparatuses) mounted in a nearby vehicle or mobile communication terminal carried around by a nearby pedestrian via radio communication (for example, a short-range wireless communication network), to receive location information of the nearby vehicle from the terminal mounted in the nearby vehicle and receive location information of the nearby pedestrian from the mobile communication terminal carried around by the nearby pedestrian.

Figure 4:
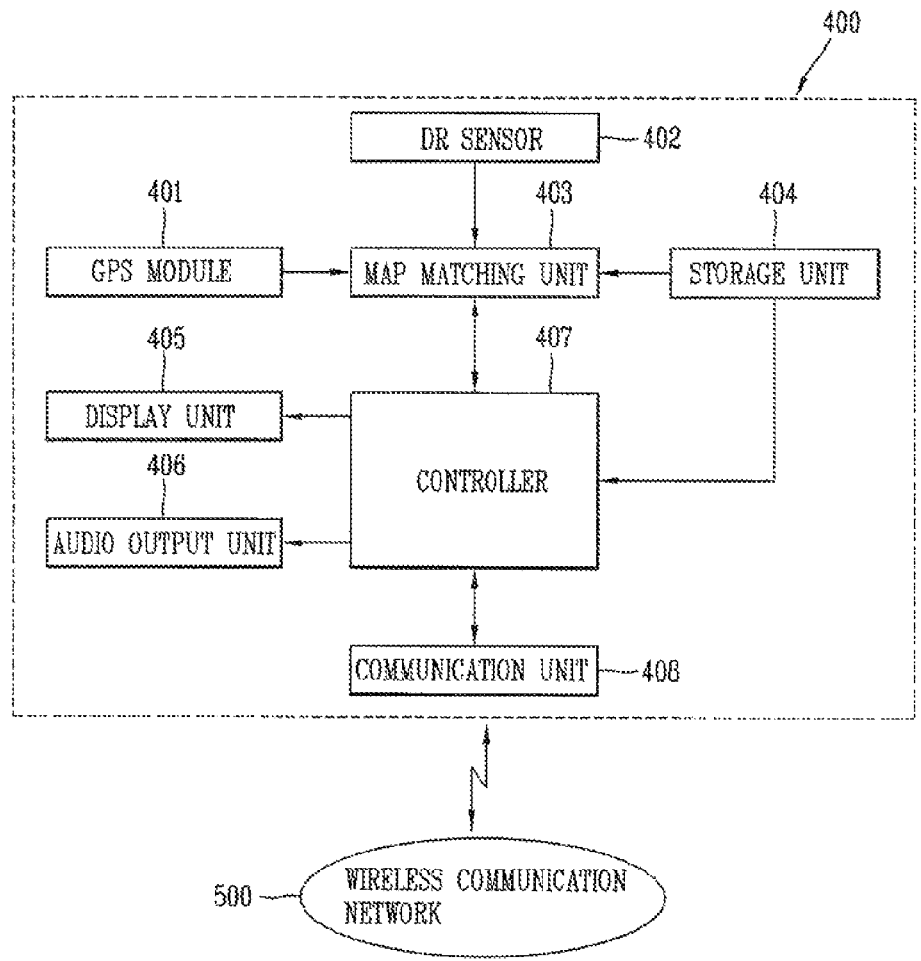
FIG. 4 is a block diagram showing a configuration of a navigation (vehicle navigation) apparatus for a mobile terminal in accordance with a first exemplary embodiment.

FIG. 4 is a block diagram showing a configuration of a navigation (vehicle navigation) apparatus 400 of a mobile terminal in accordance with a first exemplary embodiment.

The navigation (vehicle navigation) apparatus 400 may be divided into an in-dash type and an on-dash type according to an installation form in the vehicle 200. The in-dash type navigation apparatus may be inserted into a predetermined space allocated within a dash board to be fixed thereto. The on-dash type navigation apparatus may be mounted on the dash board of the vehicle 200 or installed using a particular holder near the dash board. The on-dash type navigation apparatus may be detachably attached, so it can be separated from the vehicle 200 and carried around.

The navigation apparatus 400 according to the exemplary embodiment of the present disclosure may include the in-dash type and the on-dash type navigation apparatuses. In addition, the navigation apparatus 400 may include any information processing device, which is capable of receiving and/or processing traffic information, such as various types of portable terminals which can execute a navigation function by interworking with a GPS receiver which receives navigation messages transmitted from GPS satellites within the vehicle 200.

Referring to FIG. 4, the navigation apparatus 400 may include a GPS module 401 for receiving a GPS signal received from a satellite and generating first vehicle location data of the navigation apparatus (regarded as the same location as the telematics terminal 200 or the mobile communication terminal 100) based on the received GPS signal, a dead-reckoning (DR) sensor 402 for generating second vehicle location data based upon a travel direction and the speed of a vehicle, a storage unit (or memory) 404 for storing map data and various information, a map matching unit 403 for generating an estimated vehicle location based upon the first vehicle location data and the second vehicle location data, matching the generated estimated vehicle location with a link (map matching link or map matching road) in the map data stored in the storage unit 404, and outputting the matched map information (map matched result), a communication unit 408 for receiving real-time traffic information from an information providing center and/or a nearby vehicle via a wireless communication network 500, receiving traffic light information, and performing call communication, a controller 407 for generating road guidance information based upon the matched map information (map matching results), a display unit 405 for displaying both road guidance map (including information on a point of interest (POI)) included in the road guidance information and the traffic light information, and a voice output unit 406 for outputting road guide audio (voice) information (road guide voice message) included in the road guidance information and a voice signal corresponding to the traffic light information.

The communication unit 408 may further include a hands-free having a Bluetooth module, and receive a broadcasting signal including traffic information in a TPEG format from the broadcast station via an antenna. The broadcast signal may include traffic information according to a TPEG service and a binary format for scene (BIFS) data service and supplementary information such as various supplementary data, as well as video and audio data in conformity with various standards, such as a terrestrial or satellite DMB standard, a DAB standard, a DVB-T standard, and the like. Also, the communication unit 408 may tune a signal band providing traffic information, demodulate the tuned signal, and output the same to a TPEG decoder (included in the controller 407).

The TPEG decoder may decode the traffic information in the TPEG format, and provide various information, such as traffic light information included in the traffic information, to the controller 407.

The road guidance information may include various information related to traveling, such as lane information, speed limit information, turn-by-turn information, traffic safety information, traffic guidance information, vehicle information, road search information and the like, as well as the map data.

The signal received via the GPS module 401 may be configured to provide the location information of a terminal to the navigation apparatus 400 using a wireless communication scheme proposed by Institute of Electrical and Electronics Engineers (IEEE). Examples of the wireless communication scheme may include 802.11, a standard for the wireless network for WLAN including wireless LAN, infrared communication and the like, 802.15, a standard for a wireless personal area network (PAN) including Bluetooth™, UWB, ZigBee and the like, 802.16, a standard for a wireless metropolitan area network (MAN) broadband wireless access (BWA) including a fixed wireless access (FWA) and the like, and 802.20, a standard for the mobile Internet with respect to a mobile broadband wireless access (MBWA)) including Wibro, WiMAX and the like.

The navigation apparatus 400 may further include an input unit. The input unit may allow a user to select a desired function or input information. Various devices, such as a keypad, a touch screen, a jog shuttle, a microphone and the like may be used as the input unit.

The map matching unit 403 may generate the estimated location of the vehicle based upon the first location data and the second location data, and read the map data corresponding to a travel route from the storage unit 404.

The map matching unit 403 may also match the estimated location of the vehicle with a link (road) included in the map data, and output the matched map information (map matching results) to the controller 407. For example, the map matching unit 403 may generate an estimated location of the vehicle based on the first and second location data, match the generated estimated location of the vehicle with links within the map data stored in the storage unit 404 according to the link order, and output the matched map information (map matching results) to the controller 407. Further, the map matching unit 403 may output road attribute information, such as single lane road, double lane road, and the like, included in the matched map information (map matching results) to the controller 407. The function of the map matching unit 403 may also be implemented in the controller 407.

The storage unit 404 may store map data. Here, the stored map data may include geographic coordinates (or longitude/latitude coordinates) representing latitude and longitude by a degree/minute/second (DMS) unit. Here, besides the geographic coordinates, the stored map data may also use universal transverse Mercator (UTM) coordinates, Universal Polar Stereographic (UPS) coordinates, transverse Mercator (TM) coordinates and the like.

The storage unit 404 may also store various information such as menu screen images, points of interest (hereinafter, referred to as 'POI'), function characteristics information based on a particular position of the map data, and the like.

The storage unit 404 may also store various user interfaces (UIs) and/or graphic user interfaces (GUIs).

The storage unit 404 may additionally store data, programs, and the like, which are required for operating the navigation apparatus 400.

The storage unit 404 may store destination information input by a user via the input unit. Here, the destination information may be a destination, or one of a departure (start) point and a destination.

The display unit 405 may display image information (or road guidance map) included in the road guidance information generated by the controller 407. Also, the display unit 405 may include a touch sensor (touch screen) and a proximity sensor. Furthermore, the road guidance information may include various information associated with traveling (driving, running), such as lane information, speed limit information, turn-by-turn information, traffic safety information, traffic guidance information, vehicle information, road search information and the like, as well as the map data.

When displaying the image information, the display unit 405 may display various contents such as menu screens, road guidance information, and the like, using user interfaces and/or graphic user interfaces included in the storage unit 404. The contents displayed on the display unit 405 may include various text or image data (including map data or various information data), and menu screens including icons, list menus, combo boxes, and the like.

Further, the voice output unit 406 may output voice information included in the road guidance information (or voice messages for road guidance information) generated by the controller 407. The voice output unit 406 may be an amplifier or a speaker.

The controller 407 may generate road guidance information based on the matched map information, and output the generated road guidance information to the display unit 405 and voice output unit 406. Here, the display unit 405 may display the road guidance information.

The controller 407 may receive real-time traffic information from the information providing center and/or terminals (vehicle navigation apparatus) mounted in neighboring vehicles so as to generate road guidance information.

The controller 407 may be connected to a call center via the communication unit 408 to perform call communication or transmit or receive information between the navigation system 400 and the call center. Here, the communication unit 408 may further include a hands-free module having a Bluetooth™ function using a short-range wireless communication method.

When a user selects a POI search menu, the controller 407 may search for a POI which is located in a route from the current location to the destination, and display the searched POI on the display unit 405. Here, the controller 407 may search for a POI (namely, a point at which the route does not need to be changed (researched), e.g., a POI positioned at left or right side of the traveling road) positioned on the route and/or a POI (namely, a point at which the route needs to be changed, e.g., a point at which the preset route needs to be changed in order to go through a nearby POI) located near the route, and display the searched POI on the display unit 405.

Hereinafter, the format of TPEG information will be described with reference to FIG. 5.

Figure 5:
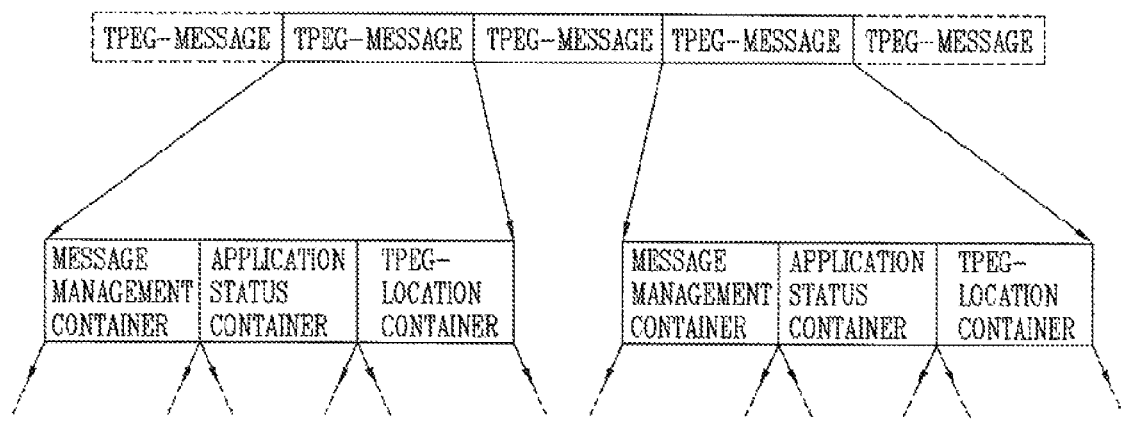
FIG. 5 is a view showing a format of TPEG information in accordance with an exemplary embodiment.

FIG. 5 is a view showing a format of TPEG information in accordance with an exemplary embodiment.

Referring to FIG. 5, TPEG information may include a sequence of message segments (referred to as 'TPEG message,' hereinafter).

Each of the message segments may be applied to different applications. For example, each TPEG message may be applied to one of a TPEG-congestion and travel-time information application, a TPEG-road traffic message application, a TPEG-public transport information application, a TPEG-multimedia based traffic and travel information application and other applications. In the exemplary embodiment of the present disclosure, traffic light information may be applied to any of the above-mentioned applications.

A unique identification number called an application identification (AID) may be assigned to each of the TPEG applications. The AID may be used to decode a received TPEG message by using the most appropriate application decoder.

An AID 0001(hex) may be assigned to the TPEG-road traffic message application, an AID 0010(hex) may be assigned to the TPEG-congestion and travel-time information application (TPEG-CTT), and an AID 0008(hex) may be assigned to the TPEG-multimedia based traffic and travel information application.

The TPEG message may include a message management container, an application status container, and a TPEG location container.

Content of the application status container may vary depending on the types of the TPEG message applications. The traffic light information according to the exemplary embodiment may be transmitted by being included in the application status container. For example, when the TPEG message is a TPEG congestion and travel-time information application (TPEG-CTT), the traffic light information may be included in the TPEG-CTT container or the application status container. In this case, the TPEG-CTT container may include congestion and travel time status information, congestion and travel time status prediction information, additional information, and the traffic light information according to the present exemplary embodiment.

The congestion and travel time status information may include information relating to an average link speed, a travel time, a link delay, and a congestion type.

The congestion and travel time status prediction information may include information relating to an average speed prediction, a travel time prediction, and a congestion tendency.

The additional information may indicate supplementary information, auxiliary information, and the like, related to the congestion and travel time status information, in a text format.

The traffic light information may include information relating to a traffic light number, a traffic light period, a signal of a traffic light at a time point at which the traffic light information was acquired, a lapse time from a time point at which a signal of the traffic light was changed to a time point at which the traffic light information was acquired, supplementary information and a time point at which the traffic light information is acquired. This will be described in detail with reference to FIG. 6. The TPEG location container may include location information relating to each link, namely, each road section. Messages transmitted by being included in the TPEG information may be location-dependent, and each message may include information relating to a location.

Figure 6:
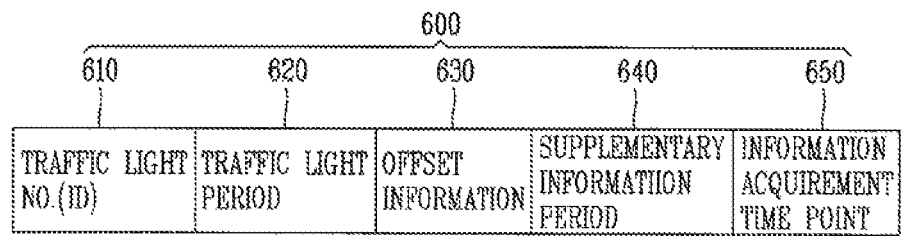
FIG. 6 is a view showing traffic light information transmitted by being included in an application status container of FIG. 5.

FIG. 6 is a view showing traffic light information transmitted by being included in an application status container of FIG. 5.

As shown in FIG. 6, traffic light information 600 may include a traffic light number 610, a traffic light period 620, offset information 630, supplementary information 640 and an information acquisition time point 650.

The traffic light number 610 may refer to an ID of each traffic light to check a traffic light included in each road section. In the TPEG, a link ID may be assigned to each road section, and the traffic light ID may be assigned in association with the link ID. For example, when three different traffic lights are included in a road section with a link ID '100,' each traffic light number may be defined as 100a, 100b and 100c.

It is merely illustrative, and the traffic light numbers may also be defined in a different manners.

The traffic light period 620 may refer to a time duration during which a traffic light maintains a current state. For example, when a traffic light includes three signals of a green traffic light, a yellow traffic light and a red traffic light, the period of the green traffic light may be one minute, the period of the yellow traffic light may be 5 seconds, and a period of the red traffic light may be 30 seconds. That is, when the time duration of one minute lapses from the time point at which the traffic light was changed to the green traffic light, the green traffic light may be changed to the yellow traffic light. And, when the time duration of 5 seconds lapses from the time point at which the traffic light was changed to the yellow traffic light, the signal may be changed from the yellow traffic light to the red traffic light.

The offset information 630 may include information relating to a signal of a traffic light at the time point at which the traffic light information was acquired, and a lapse time from a time point at which a signal of the traffic light was changed to a time point at which the traffic light information was acquired. For example, the offset information 630 may include information indicating that the a B traffic light is currently a red signal and information indicating that 30 seconds has lapsed since the traffic light was changed to the red signal.

The supplementary information 640 may include information relating to whether the traffic light is turned on or off, whether or not the traffic light is in disorder, whether or not a reversible lane is opened.

The information acquisition time point 650 may include the aforementioned traffic light information, namely, information relating to a time point at which the current traffic light number 610, the traffic light period 620, the offset information 630, the additional information 640 and the like were acquired.

Hereinafter, description will be given of an apparatus and method for providing information, capable of providing information relating to a user profile according to a travel state of a vehicle and/or a current location of the vehicle, with reference to FIGS. 7 to 11.

Figure 7:
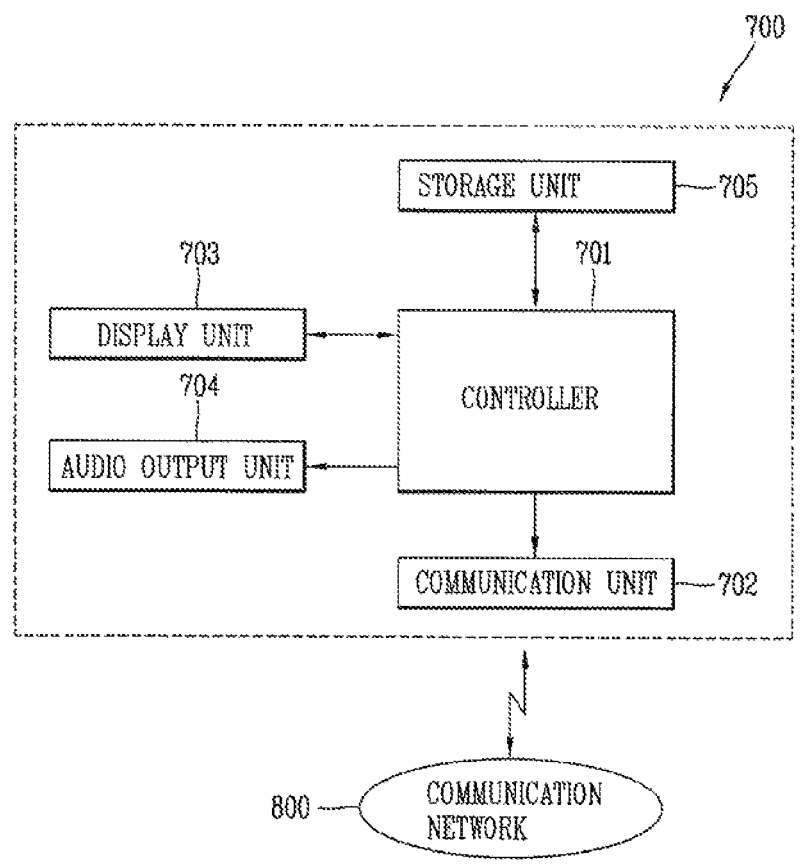
FIG. 7 is a view showing a configuration of an information providing apparatus in accordance with exemplary embodiments.

FIG. 7 is a view showing a configuration of an information providing apparatus in accordance with exemplary embodiments.

As shown in FIG. 7, an information providing apparatus 700 in accordance with exemplary embodiments of the present disclosure may include a controller 701 for detecting a travel state of a vehicle, detecting a current location of the vehicle, and acquiring a user profile associated with the vehicle, and an output unit (for example, a display unit 703 and/or a voice output unit 704) for outputting information relating to the travel state of the vehicle, the current location and the user profile.

The information providing apparatus 700 in accordance with the exemplary embodiments of the present disclosure may further include a storage unit 705 and a communication unit 702. The communication unit 702 may be the mobile communication terminal 100. For example, the mobile communication terminal 100 may play a role of an access pointer for requesting and receiving corresponding information (for example, traffic light information, information set for a current location, information according to user information of those information set for the current location, etc.) from a server and/or the traffic light, and transmitting the received information to the controller 701.

Figure 8:
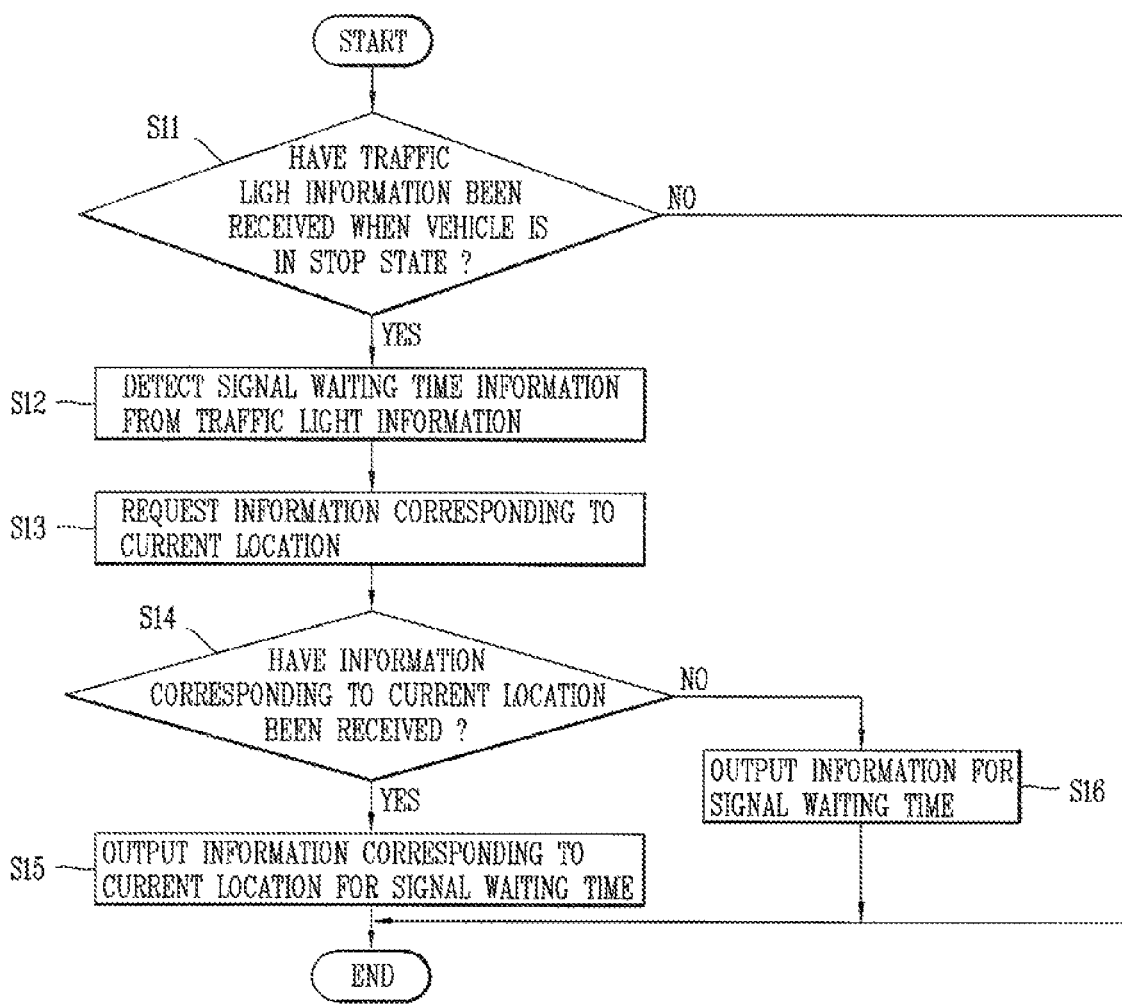
FIG. 8 is a flowchart showing a method for providing information in accordance with a first exemplary embodiment.

FIG. 8 is a flowchart showing a method for providing information in accordance with a first exemplary embodiment.

The controller 701 may determine whether or not traffic light information has been received from a traffic light via the communication unit 702 when a vehicle stopped while traveling along a travel route (S11).

Figure 9:
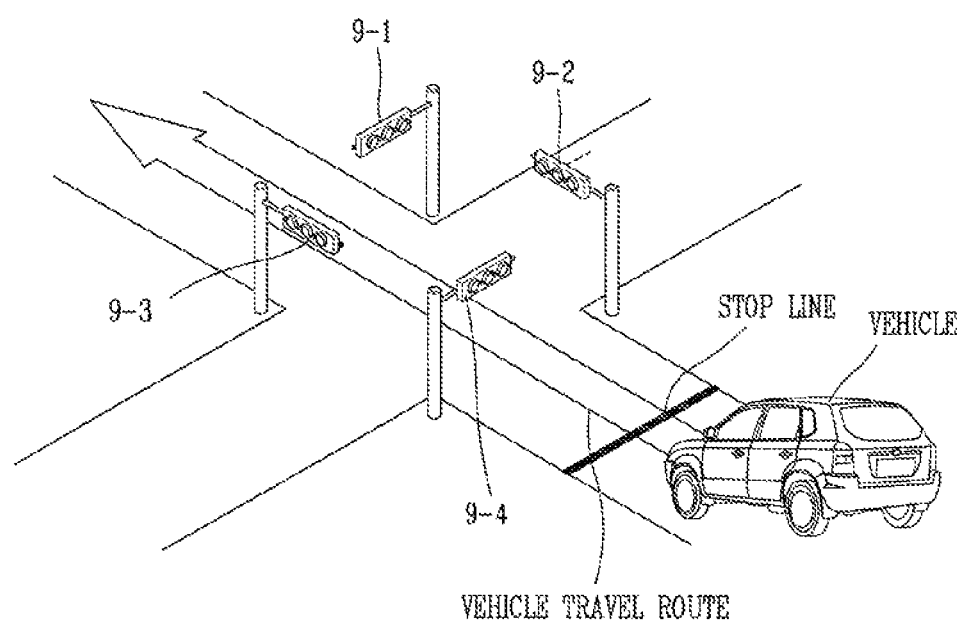
FIG. 9 is an exemplary view showing a plurality of traffic lights installed at an intersection.

FIG. 9 is an exemplary view showing a plurality of traffic lights installed at an intersection.

As shown in FIG. 9, the communication unit 702 may receive each traffic light information and each traffic light location information from a plurality of traffic lights 9-1, 9-2, 9-3 and 9-4 installed at an intersection, and output the received information to the controller 701. Here, the controller 701 may compare each traffic light location information with a current traveling direction (travel route) of the vehicle, decide a traffic light (for example, 9-4) located in the current traveling direction of the vehicle, extract only traffic light information transmitted from the decided traffic light 9-4, and display the extracted traffic light information on the display unit 703 or store such information in the storage unit 705.

The controller 701 may detect signal waiting time information from the received traffic light information (S12). The signal waiting time information may be included in the traffic light information. For example, the controller 701 may detect from the traffic light information a time (for example, 30 seconds), which is taken until a vehicle stop signal (red traffic light) changes to a vehicle travel signal (green traffic light), as the signal waiting time information.

The controller 701 may request information corresponding to the current location (for example, multimedia data, video, image, audio and the like) from a server (not shown) via the communication unit 702 (S13). For example, the controller 701 may request information, such as advertising (for example, local advertising), image, voice, music and the like all corresponding to the current location, from the server (not shown) via the communication unit 702. The controller 701 may also read from the storage unit 705 information, such as advertising, image (for example, movie, music video, local picture, electronic book (e-book), etc.), voice, music, audio book and the like, corresponding to the current location.

The controller 701 may also request information (for example, multimedia data), corresponding to user information (user preference or user profile), of the information (for example, multimedia data) corresponding to the current location, from the server (not shown) via the communication unit 702.

Upon reception of the information corresponding to the current location (S 14), the controller 701 may output the information corresponding to the current location to the display unit 703 and/or the voice output unit 704 for the signal waiting time (S15). For example, when it is difficult or impossible for a driver (user) to view an image during traveling or according to the road traffic law of the corresponding nation, the controller 701 may output information corresponding to the current location to the display unit 703 and/or the voice output unit 704 only for the signal waiting time. This may allow the user to view the corresponding information for the signal waiting time.

The controller 701 may also output information (for example, fashion advertising, action movie, classical music, e-book novel, an audio book novel, etc.) corresponding to the user information (user preference or user profile information), of the information designated for the current location, to the display unit 703 and/or the voice output unit 704 only for the signal waiting time.

Upon receiving information decided by the server other than the information corresponding to the current location, the controller 701 may also output the server-decided information to the display unit 703 and/or the voice output unit 704.

The controller 701 may block the output of the information when the signal waiting time elapses. Also, after the lapse of the signal waiting time, the controller 701 may output the information in a continuous manner while the vehicle is waiting for the next traffic signal after the output of the information has been blocked. For example, if it is assumed that the signal waiting time is 30 seconds and an advertising time is 50 seconds, the controller 701 may output the advertising from 31 to 50 seconds to the output unit (for example, the display unit 703 and/or the voice output unit 704) for the next signal waiting time.

When the signal waiting time is detected, the controller 701 may output information (for example, movie, music video, picture, voice, music, e-book, audio book, etc.) stored in the storage unit 705 to the display unit 703 and/or the voice output unit 704 for the signal waiting time, without requesting the information from the server.

Therefore, in accordance with the apparatus and method for providing information according to the first exemplary embodiment, when the driver is difficult to view a video or the like during traveling or unable to view the video or the like due to the road traffic law of the corresponding nation, the information corresponding to the current location may be automatically output to the display unit and/or the video output unit only for the signal waiting time, thereby allowing the user to view the corresponding information for the signal waiting time.

In accordance with the apparatus and method for providing information according to the first exemplary embodiment, when the driver is difficult to view a video or the like during traveling or unable to view the video or the like due to the road traffic law of the corresponding nation, information according to user information of the information corresponding to the current location may be automatically output to the display unit and/or the video output unit only for the signal waiting time, thereby allowing the user to view desired information for the signal waiting time.

Figure 10:
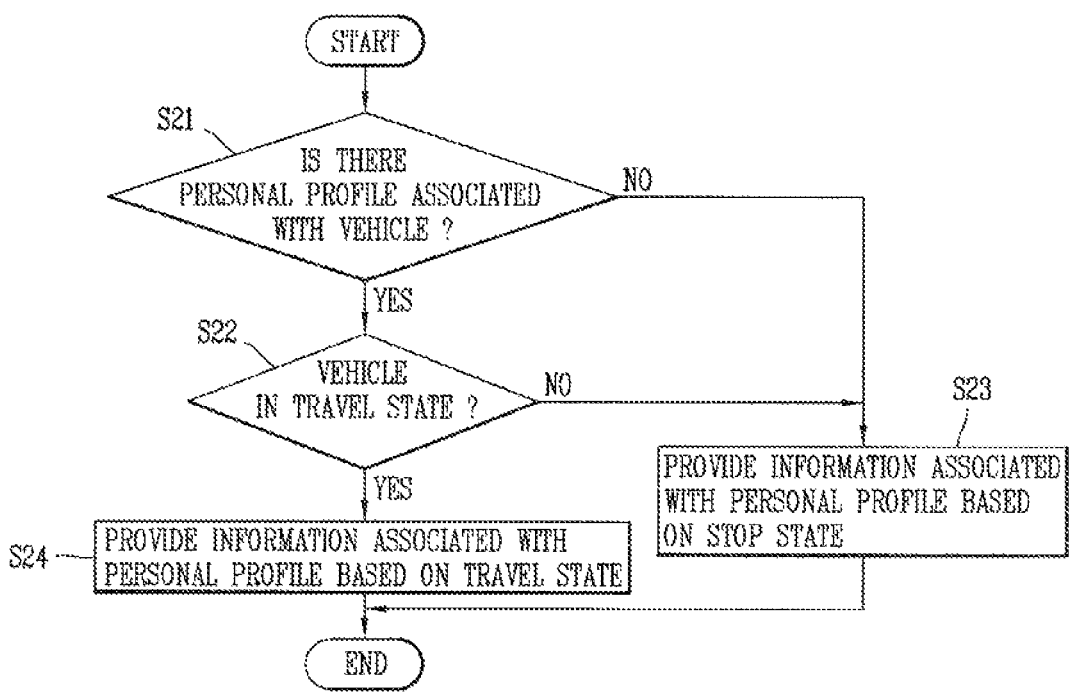
FIG. 10 is a flowchart showing a method for providing information in accordance with a second exemplary embodiment.

FIG. 10 is a flowchart showing a method for providing information in accordance with a second exemplary embodiment.

The controller 701 may acquire a personal profile associated with a vehicle (S21). For example, the controller 701 may receive the personal profile associated with the vehicle from the server via the communication unit 702 or read the personal profile from the storage unit 705. The controller 701 may update the personal profile associated with the vehicle periodically or in real time as the vehicle is traveling.

The personal profile associated with the vehicle may include travel distance on usual day or ordinary average regular day, the number of usual sudden stops, total travel record, average travel speed, average travel distance, the number of operating a horn on usual day, average fuel filling period and the like.

The controller 701 may determine a current travel state of the vehicle (S22). For example, the controller 701 may determine whether the vehicle is moving or in a stop state.

When the vehicle has stopped (the travel state is the stop state), the controller 701 may provide information associated with (optimized for) the personal profile according to the stop state (S23). For example, in the stop state of the vehicle, the controller 701 may transmit a personal profile (for example, user preference information) according to the stop state to the server, receive information (for example, advertising, image, voice, music, e-book, audio book, etc.) associated with the personal profile (for example, the user preference information) from the server, and output the received information to the output unit.

In the moving state of the vehicle, the controller 701 may provide information associated with (optimized for) the personal profile according to the moving state (S24). For example, when the vehicle is moving, the controller 701 may receive the number of usual sudden stop (usual sudden stop count) (i.e., a reference sudden stop count) associated with the personal profile according to the moving state. The controller 701 may generate warning information (for example, 'Keep safe distance') when the sudden stop count on the corresponding day is more than the usual sudden stop count. The controller 701 may then form a communication network with a vehicle adjacent to the vehicle (for example, the following vehicle), and transmit the warning information to the adjacent vehicle (for example, the following vehicle). That is, a driver who frequently stops a vehicle suddenly on usual day may inform the following vehicle to keep a more safe distance, thereby preventing an accident caused due to an unsecured safe distance. Also, with selective transmission and reception of data, a communication time may be reduced. This may result in quick response to the user and reduction of communication charges by virtue of reduction of communication data rate. The controller 701 may decide that one-time sudden stop has been made when the current speed of the vehicle is reduced by a preset speed within a preset time. For example, when the speed of the vehicle is slowed down to 70 km/h in a preset time (for example, in 1 to 2 seconds) while traveling at a speed of 100 km/h, the controller 701 may regard it as a one-time sudden stop. The preset time (for example, 1 to 2 seconds) may be changed by a designer or a user.

When the vehicle is moving (i.e., the travel state is a moving state), the controller 701 may predict a driving available distance per day based on the travel distance on usual day, associated with the personal profile according to the moving state, and selectively provide points of interest (POIs) located within the predicted distance. The controller 701 may detect a POI corresponding to a personal preference included in the personal profile from the POIs, and display the detected POI on the display unit 703.

When the vehicle is moving (i.e., the travel state is a moving state), the controller 701 may provide the user (driver) with information required in the moving state. For example, in the moving state of the vehicle, the controller 701 may receive traffic information and the like from the server via the communication unit 702, and output the received traffic information and the like through the display unit 703 and/or the voice output unit 704. The information required in the moving state may further include traffic directional signs, speed limit information, travel speed information to pass through the next traffic light within a travel signal period of the next traffic light (the period of a green traffic light), and the like.

On the other hand, while the vehicle is stopping (i.e., the travel state is a stop state), the controller 701 may provide the user (driver) with information required in the stop state. For example, when the vehicle is in the stop state, the controller 701 may receive schedule information and the like from the server via the communication unit 702 or the storage unit 705, and output the received schedule information and the like through the display unit 703 and/or the voice output unit 704. The information required in the stop state may further include advertising image information specialized for a corresponding point or POI information relating to a corresponding area.

The personal profile associated with the vehicle may be managed by a near field communication (NFC) technology or the like. For example, upon being tagged to NFC within the vehicle, the controller 701 may automatically load a travel record up to date, an average travel speed, an average travel distance, an average mileage and the like, and acquire information optimized for those information from a server (for example, Cloud) or via communication between vehicles (or communication between the vehicle and a terminal or communication between the vehicle and the server).

Therefore, in the information providing apparatus and method according to the second exemplary embodiment of the present disclosure, the information associated with the personal profile according to the travel state of the vehicle may be provided to the user (driver), allowing for providing individually specialized information.

Figure 11:
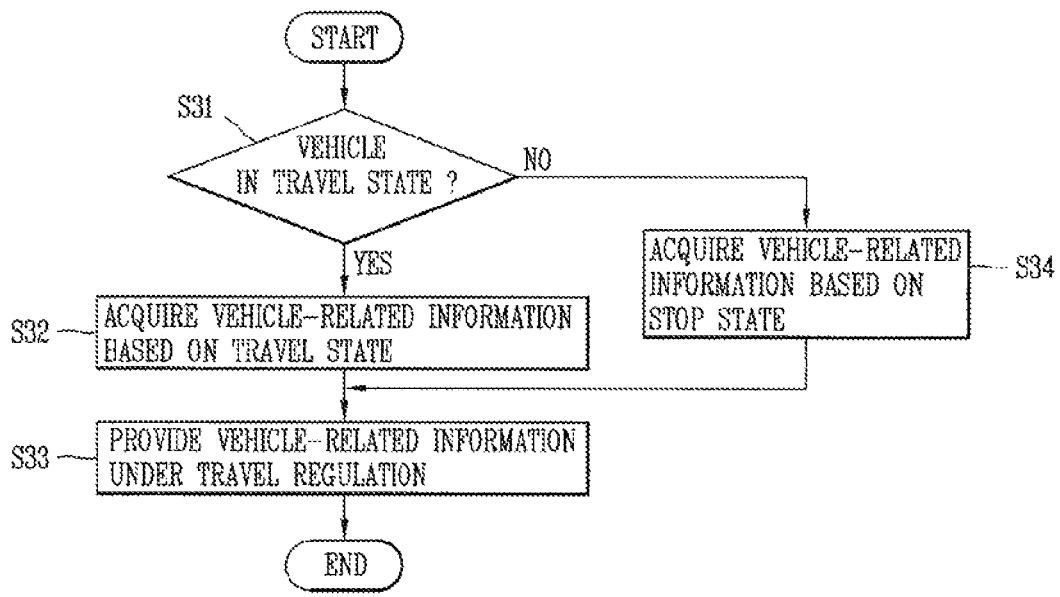
FIG. 11 is a flowchart showing a method for providing information in accordance with a third exemplary embodiment.

FIG. 11 is a flowchart showing a method for providing information in accordance with a third exemplary embodiment.

The controller 701 may determine a current travel state of the vehicle (S31). For example, the controller 701 may determine whether the vehicle is moving or has stopped.

When the vehicle is moving (i.e., the travel state is a moving state), the controller 701 may acquire information relating to the vehicle based on the moving state (S32). For example, in the moving state of the vehicle, the controller 701 may receive vehicle-related information from the server via the communication unit 702 or from the storage unit 705, and output the received vehicle-related information through the display unit 703 and/or the voice output unit 704. The vehicle-related information based on the moving state may further include traffic directional signs, speed limit information, travel speed information to pass through the next traffic light within a travel signal period of the next traffic light (the period of a green traffic light), and the like. The vehicle-related information based on the moving state may further include information corresponding to a user preference for information in the moving state.

The controller 701 may automatically provide the user with the vehicle-related information based on the moving state according to information (for example, prohibition against watching a multimedia broadcast (image) during driving, allowance for watching a multimedia broadcast (image) during a stop, etc.) corresponding to the road regulation in the road traffic law (or a regulation for drivers' behavior in the road traffic law) (S33). For example, when the driver is prohibited from watching an image during driving under the road regulation, the controller 701 may merely output an audio signal through the voice output unit 704, with blocking an image signal in the received vehicle-related information. This may allow the user (driver) to drive according to the road regulation (or the driver behavior regulation in the road traffic law) and focus on driving while driving the vehicle.

On the other hand, when the vehicle has stopped (i.e., the travel state is a stop state), the controller 701 may acquire vehicle-related information based on the stop state (S34). For example, when the vehicle has stopped (i.e., in the stop state), the controller 701 may receive the vehicle-related information from the server via the communication unit 702 or from the storage unit 705, and output the received vehicle-related information through the display unit 703 and/or the voice output unit 704. The information based on the stop state may further include advertising image information specialized for a corresponding point or POI information relating to a corresponding area. The information based on the stop state may further include user preference information.

The controller 701 may automatically provide the user with the vehicle-related information based on the stop state according to the road regulation in the road traffic law. For example, when the driver is allowed to watch an image in the stop state under the road regulation, the controller 701 may output the received vehicle-related information through the display unit 703 and/or the voice output unit 704, such that the user (driver) can view the vehicle-related information based on the stop state while the vehicle is in the stop state.

The controller 701 may automatically provide the user with the vehicle-related information based on the stop state according to the road regulation in the road traffic law (or the driver behavior regulation in the road traffic law), and simultaneously output the vehicle-related information for the signal waiting time.

The controller 701 may change a music genre depending on a current speed of the vehicle when a music file is being played. For example, when the current speed of the vehicle is more than a reference speed while the music file is played, the controller 701 may automatically select and play a classical music to prevent speeding. Or, when the current speed of the vehicle is below the reference speed while the music file is played, the controller 701 may automatically select and play a rock music or the like to prevent drowsy driving. The reference speed may change according to a designer's or user's intension.

Therefore, in accordance with the information providing apparatus and method according to the third exemplary embodiment of the present disclosure, the user may be automatically provided with the vehicle-related information according to the road regulation, so as to drive the vehicle according to the road regulation, focus on driving while the user drives, and automatically view the vehicle-related information based on the stop state while the user (driver) stops the vehicle.

Figure 12:
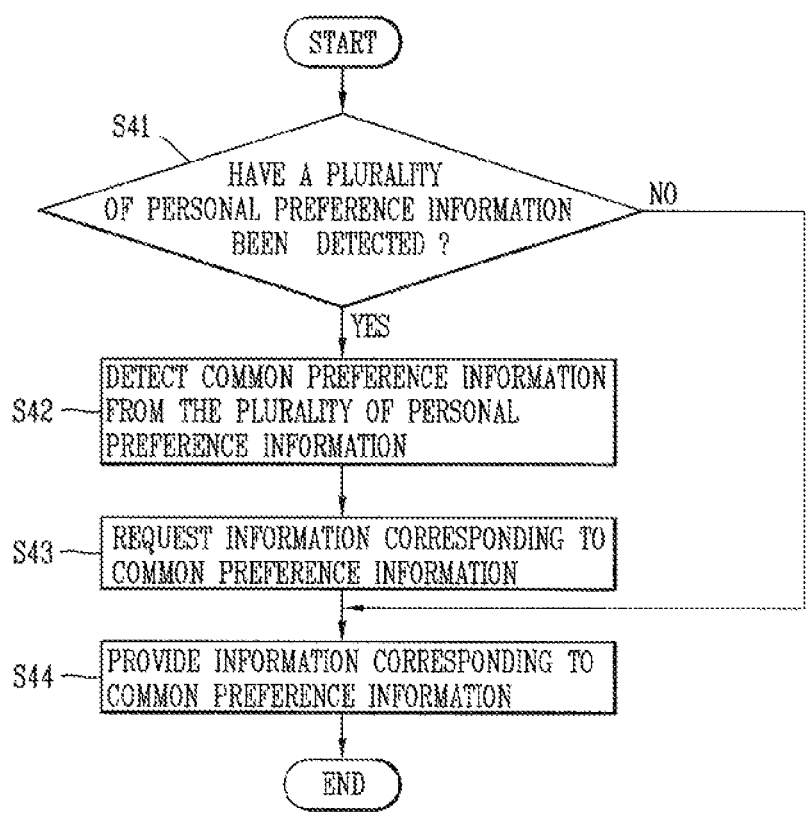
FIG. 12 is a flowchart showing a method for providing information in accordance with a fourth exemplary embodiment.

FIG. 12 is a flowchart showing a method for providing information in accordance with a fourth exemplary embodiment.

The controller 701 may determine whether or not a plurality of personal preference information have been detected (S41). For example, the controller 701 may acquire a plurality of personal profiles from mobile terminals belonging to a plurality of passengers in the vehicle, and detect a plurality of personal preference information included in the acquired plurality of personal profiles. The personal preference information may include information relating to favorite music genre, favorite movie genre, a favorite road (for example, highway, a national road, a dirt road, a mountainous road, etc.), a POI (for example, a favorite restaurant) and the like.

The controller 701 may output common preference information from the plurality of personal preference information (S42). For example, the controller 701 may detect commonly favorite music genre, movie genre, road (for example, highway, a national road, a dirt road, a mountainous road, etc.), POI (for example, a favorite restaurant) and the like, from the plurality of personal preference information received from the mobile terminals belonging to the respective passengers in the vehicle.

The controller 701 may request for information (data) corresponding to the common preference information (S43). For example, the controller 701 may detect the information (data) corresponding to the common preference information from the storage unit 705 or request such information (data) from the server.

The controller 701 may receive the information (data) corresponding to the common preference information, and provide the received information to the user (S44). For example, when a music play request corresponding to the common preference information is received from the user, the controller 701 may record music files, which match the commonly preferred music genre, on a list of music files, and play the music files recorded on the list of music files in a sequential or random manner. The controller 701 may detect the music files corresponding to the commonly preferred music genre from music files previously stored in the storage unit 705, or receive the corresponding music files from the plurality of mobile terminals or the server. The controller 701 may display the list of music files including the music files matched with the common favorite music genre on the display unit 703.

When a road guidance request corresponding to the common preference information is received from the user, the controller 701 may select a route (path), which is commonly preferred, from a plurality of routes from the current location to a destination, and provide road guidance information relating to the selected route. The controller 701 may detect a route including the commonly preferred road from the storage unit 705 or receive the route from the server. The controller 701 may also provide the user with information corresponding to preference information, excluding the common preference information, of the plurality of personal preference information.

The controller 701 may differently provide the road guidance information according to the speed of the vehicle when providing the road guidance information relating to the route from the current location to the destination. For example, for providing the road guidance information relating to the route from the current location to the destination, the controller 701 may also briefly provide the road guidance information when the current speed of the vehicle is below a preset reference speed, and provide the road guidance information in detail when the current speed of the vehicle is more than the preset reference speed. In addition, for providing the road guidance information relating to the route from the current location to the destination, the controller 701 may also provide three-dimensional (3D) map data when the current speed of the vehicle is below a preset reference speed, and provide two-dimensional (2D) road data when the current speed of the vehicle is more than the preset reference speed.

Upon providing the road guidance information relating to the route from the current location to the destination, the controller 701 may determine whether or not a maintenance period of the vehicle has come based on the vehicle-related information (for example, oil replacement period or tire replacement interval of the period). When the current speed of the vehicle is less than a preset reference speed and the current location of the vehicle is close to a repair shop, the controller 701 may display information indicating that the maintenance period of the vehicle has come on the display unit 703, and provide the road guidance information relating to the route from the current location of the vehicle to the repair shop in response to a user request.

Therefore, in the information providing apparatus and method according to the fourth exemplary embodiment of the present disclosure, the user (driver) may be provided with information corresponding to common preference information (for example, music, route, video, POI, etc.) included in a plurality of personal preference information received from a plurality of mobile terminals belonging to a plurality of passengers in the vehicle, allowing the plurality of passengers in the vehicle to be provided with commonly favorite information.

As described above, in accordance with the apparatus and method for providing information according to the exemplary embodiments, when a user (driver) is difficult to view a video or the like during traveling or unable to view the video or the like due to the road traffic law of a corresponding nation, information corresponding to a current location may be automatically output to a display unit and/or a video output unit only for a signal waiting time, thereby allowing the user to view the corresponding information for the signal waiting time.

In accordance with the apparatus and method for providing information according to the exemplary embodiments, when the driver is difficult to view a video or the like during traveling or unable to view the video or the like due to the road traffic law of the corresponding nation, information according to user information included in the information corresponding to the current location may be automatically output to the display unit and/or the video output unit only for the signal waiting time, thereby allowing the user to view desired information for the signal waiting time.

In the information providing apparatus and method according to the exemplary embodiments of the present disclosure, information associated with a personal profile according to a travel state of a vehicle may be provided to a user (driver), allowing for providing individually specialized information.

In accordance with the information providing apparatus and method according to the exemplary embodiments of the present disclosure, a user may be automatically provided with vehicle-related information according to a road regulation, so as to drive the vehicle according to the road regulation, focus on driving while the user drives, and automatically view the vehicle-related information based on a stop state while the user (driver) stops the vehicle.

In the information providing apparatus and method according to the exemplary embodiments of the present disclosure, a user (driver) may be provided with information corresponding to common preference information (for example, music, route, video, POI, etc.), included in a plurality of personal preference information received from a plurality of mobile terminals belonging to a plurality of passengers in the vehicle, allowing the plurality of passengers in the vehicle to be provided with commonly favorite information.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method performed by a vehicle to output information for vehicle occupants, the method comprising:
   determining via a controller that a travel state of the vehicle is a first state;
   selecting a first information output system of the vehicle corresponding to the first state;

selecting a first type of information based on the first state;
outputting the first type of information via the first information output system;
determining via the controller a change of the travel state of the vehicle from the first state to a second state;
ceasing the output of the first type of information via the first information output system in response to the change of the travel state from the first state to the second state.

2. The method of claim 1, wherein the travel state is based on a comparison of a speed of the vehicle to a predetermined speed.

3. The method of claim 2, wherein the first state is one of a moving state and a stop state, and the second state is the other of the moving state and the stop state.

4. The method of claim 2, wherein:
the first state is one of a faster state in which the speed of the vehicle is greater than the predetermined speed and a slower state in which the speed of the vehicle is less than the predetermined speed; and
the second state is the other of the faster state and the slower state.

5. The method of claim 1, wherein the travel state is based on navigation information.

6. The method of claim 5, wherein the navigation information includes traffic light data of a traffic light along a route of the vehicle, the traffic light data including at least a traffic light number, a traffic light period, offset information, supplementary information, and an information acquisition time point.

7. The method of claim 1, further comprising:
selecting a second information output system; and
outputting the first type of information via the second information output system in response to the change of the travel state from the first state to the second state.

8. The method of claim 7, wherein:
the first information output system includes an image display system and an audio system;
the first type of information includes multimedia information that includes image data;
outputting the first type of information via the first information output system includes displaying the image data by the image display system and outputting the audio data by the audio system;
the second information output system includes the audio system and excludes the image display system;
ceasing the output of the first type of information via the first information output system includes ceasing display of the image data; and
outputting the first type of information via the second information output system includes continuing the output of the audio data by the audio system.

9. The method of claim 1, further comprising:
outputting a second type of information via the first information output system in response to the change of the travel state from the first state to the second state.

10. The method of claim 9, wherein the first type of information includes one of higher-detail information and lower-detail information, and the second type of information includes the other of the higher-detail information and the lower-detail information.

11. The method of claim 10, wherein:
the higher-detail information includes navigation information including a three-dimensional map; and
the lower-detail information includes navigation information including a two-dimensional map.

12. The method of claim 1, further comprising:
determining via the controller a current location of the vehicle, wherein:
selecting the first type of information is further based on the current location; and
the first type of information includes at least advertising information, point of interest information, traffic information, or navigation information.

13. The method of claim 1, further comprising:
obtaining a user profile associated with the vehicle, wherein selecting the first type of information is further based on the user profile.

14. The method of claim 13, wherein the user profile includes user preference information.

15. The method of claim 14, wherein the travel state of the vehicle is a stop state, the method further comprising:
determining via the controller a current location of the vehicle in the stop state; and
obtaining multimedia information associated with the current location,
wherein selecting the first type of information includes determining a portion of the multimedia information that corresponds to the user preference information.

16. An apparatus for output of information to vehicle occupants, the apparatus comprising:
a first information output system configured to output information; and
a controller configured to:
determine that a travel state of the vehicle is a first state,
select the first information output system of the vehicle corresponding to the first state,
select a first type of information based on the first state,
control the first information output system to output the first type of information,
determine a change of the travel state of the vehicle from the first state to a second state, and
cease the output of the first type of information via the first information output system in response to the change of the travel state from the first state to the second state.

17. The apparatus of claim 16, wherein the travel state is based on a comparison of a speed of the vehicle to a predetermined speed.

18. The apparatus of claim 17, wherein the first state is one of a moving state and a stop state, and the second state is the other of the moving state and the stop state.

19. The apparatus of claim 17, wherein:
the first state is one of a faster state in which the speed of the vehicle is greater than the predetermined speed and a slower state in which the speed of the vehicle is less than the predetermined speed; and
the second state is the other of the faster state and the slower state.

20. The apparatus of claim 16, wherein the travel state is based on navigation information.

21. The apparatus of claim 20, wherein the navigation information includes traffic light data of a traffic light along a route of the vehicle, the traffic light data including at least a traffic light number, a traffic light period, offset information, supplementary information, and an information acquisition time point.

22. The apparatus of claim 16, further comprising:
a second information output system configured to output information,
wherein the controller is further configured to:
select the second information output system, and control the second information output system to output the first type of information in response to the change of the travel state from the first state to the second state.

23. The apparatus of claim 22, wherein:
the first information output system includes an image display system and an audio system;
the first type of information includes multimedia information that includes image data that is displayed by the image display system and audio data that is output by the audio system;
the controller is further configured to control the image display system to display the image data and to control the audio system to output the audio data;
the second information output system includes the audio system and excludes the image display system;
the controller is further configured to cease the display of the image data by the image display system and to continue the output of the audio data by the audio system in response to the change of the travel state from the first state to the second state.

24. The apparatus of claim 16, wherein the controller is further configured to control the first information output system to output a second type of information in response to the change of the travel state from the first state to the second state.

25. The apparatus of claim 24, wherein:
the first type of information includes one of higher-detail information and lower-detail information; and
the second type of information includes the other of the higher-detail information and the lower-detail information.

26. The apparatus of claim 25, wherein:
the higher-detail information includes navigation information including a three-dimensional map; and
the lower-detail information includes navigation information including a two-dimensional map.

27. The apparatus of claim 16, wherein the controller is further configured to determine a current location of the vehicle, wherein:
selecting the first type of information is further based on the current location; and
the first type of information includes at least advertising information, point of interest information, traffic information, or navigation information.

28. The apparatus of claim 16, wherein the controller is further configured to obtain a user profile associated with the vehicle, wherein selecting the first type of information is further based on the user profile.

29. The apparatus of claim 28, wherein the user profile includes user preference information.

30. The apparatus of claim 29, wherein the travel state of the vehicle is a stop state, and the controller is further configured to:
determine a current location of the vehicle in the stop state; and
obtain multimedia information associated with the current location,
wherein selecting the first type of information includes determining a portion of the multimedia information that corresponds to the user preference information.

* * * * *